US008484233B2

(12) United States Patent
Xie et al.

(10) Patent No.: US 8,484,233 B2
(45) Date of Patent: Jul. 9, 2013

(54) FACET, LOGIC AND TEXTUAL-BASED QUERY COMPOSER

(75) Inventors: Yin Xie, Bellevue, WA (US); Sonia Patricia Carlson, Kirkland, WA (US); Brian S. Aust, Redmond, WA (US); Oscar G. Naim, Redmond, WA (US); Chris D. Karkanias, Sammamish, WA (US); George G. Robertson, Northeast Harbor, ME (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 12/484,181

(22) Filed: Jun. 13, 2009

(65) Prior Publication Data

US 2010/0114931 A1 May 6, 2010

Related U.S. Application Data

(60) Provisional application No. 61/107,022, filed on Oct. 21, 2008.

(51) Int. Cl.
*G06F 7/00* (2006.01)
*G06F 17/30* (2006.01)

(52) U.S. Cl.
USPC .......................................................... 707/758

(58) Field of Classification Search
USPC ......................................... 707/758, 999.004
See application file for complete search history.

(56) References Cited

U.S. PATENT DOCUMENTS

| 7,310,639 | B2 | 12/2007 | Dettinger et al. |
| 2004/0044661 | A1* | 3/2004 | Allen et al. ........................ 707/3 |
| 2006/0167927 | A1* | 7/2006 | Edelstein et al. ............. 707/102 |
| 2006/0195425 | A1 | 8/2006 | Deem et al. |
| 2006/0265417 | A1* | 11/2006 | Amato et al. ................. 707/102 |
| 2007/0094288 | A1 | 4/2007 | Enenkiel |
| 2007/0136221 | A1 | 6/2007 | Sweeney et al. |
| 2007/0233654 | A1* | 10/2007 | Karlson et al. ..................... 707/3 |
| 2008/0040308 | A1 | 2/2008 | Ranganathan et al. |
| 2009/0327271 | A1* | 12/2009 | Amitay et al. .................... 707/5 |
| 2010/0077001 | A1* | 3/2010 | Vogel et al. .................... 707/777 |

OTHER PUBLICATIONS

"Semantic Technologies for the Enhancement of Case based Learning: Technical Appendix", Retrieved at<<http://tel.caret.cam.ac.uk/wp-content/uploads/2008/05/technical_appendix_v2.doc>>, p. 1-6.

Karlson, et al."FaThumb: A Facet-based Interface for Mobile Search", Retrieved at<<http://research.microsoft.com/vibe/pubs/CHI2006-FaThumb.pdf>>, CHI 2006, Apr. 22-28, 2006, Montréal, Québec, Canada, pp. 10.

(Continued)

*Primary Examiner* — Aleksandr Kerzhner
(74) *Attorney, Agent, or Firm* — Gonzalez Saggio & Harlan LLP

(57) ABSTRACT

Described is a technology for composing queries by user interaction with objects and facets. A facet-based user interface allows users to select facets for use as filtering criteria, and a logic-based user interface allows users to logically combine object data. Query logic that processes the filtering criteria and/or logically combines the object data into a query. The facet-based user interface and logic-based user interface may be accessed via a unified user interface. The unified user interface may also provide a text editor for composing a text-based query.

19 Claims, 5 Drawing Sheets

OTHER PUBLICATIONS

Bradley, et al."semCDI: A Query Formulation for Semantic Data Integration in caBIG", Retrieved at<<http://www.jamia.org/cgi/content/abstract/15/4/559>>, First published Apr. 24, 2008 as JAMIA PrePrint; doi:10.1197/jamia.M2732, pp. 2.

Borsje, et al."Graphical Query Composition and Natural Language Processing in an RDF Visualization Interface", Retrieved at<<http://www.jborsje.nl/publications/bachelor-thesis.pdf>>, pp. 1-100.

Wang, et al."A Typed Higher-Order Calculus for Querying XML Databases", Retrieved at<<http://crpit.com/confpapers/CRPITV75Wang.pdf>>, pp. 11.

Fauqueur, et al."Logical Query Composition from Local Visual Feature Thesaurus", Retrieved at<<http://citeseerx.ist.psu.edu/viewdoc/summary?doi=10.1.1.14.4431>>, pp. 8.

Erling Orri, "SPARQL End Point Self Description", Retrieved at<<http://www.openlinksw.com/weblog/oerling/?id=1085>>, pp. 3.

\* cited by examiner

FACET, LOGIC AND TEXTUAL-BASED QUERY COMPOSER

CROSS-REFERENCE TO RELATED APPLICATION

The present application claims priority to U.S. provisional patent application Ser. No. 61/107,022, filed Oct. 21, 2008, hereby incorporated by reference.

BACKGROUND

Researchers use different approaches when trying to find the answers to their questions. There are many situations in which researchers do not know exactly what the actual question is (e.g., a discovery scenario), while there are other situations in which even though researchers know exactly what they want to ask (e.g., a known path scenario), they might start at completely different points in order to get to the same result.

Traditional software query environments usually provide a single way to compose the actual question a researcher wants to ask. This is very restrictive, because this is not the natural way researchers tend to think. Further, not all researchers know a specific query language.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which queries may be composed by various mechanisms, including a facet-based user interface by which users select filtering criteria, and a logic-based user interface by which users logically combine object data. Query logic that processes the filtering criteria and/or logically combines the object data into a query.

The query logic processes the filtering criteria into a query by logically AND-ing the selected facets. The query logic combines the object data into a query by logically combining sets of object data, each set combined via a user-selectable logical expression. For example, the facet-based user interface may help researchers in the discovery scenario, while the logic-based user interface may help researchers in the known path scenario.

In one implementation, the facet-based user interface and logic-based user interface may be accessed via a unified user interface. The unified user interface may also provide a text editor for composing a text-based query.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a rich software query composing environment, in which a researcher may start composing a query by typing the actual text of the query using the SPARQL query language, and as described herein, also may use techniques such as faceted browsing (for easy data navigation and filtering) and a logic composer (for composing complex queries). Users can also jump back and forth between these different views while composing their queries, giving them significant flexibility for doing their research.

While the examples herein are described in the context of a composable, active, and open collection of tools, services, processes, and knowledge representations specifically designed for life science researchers, it is understood these are only examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
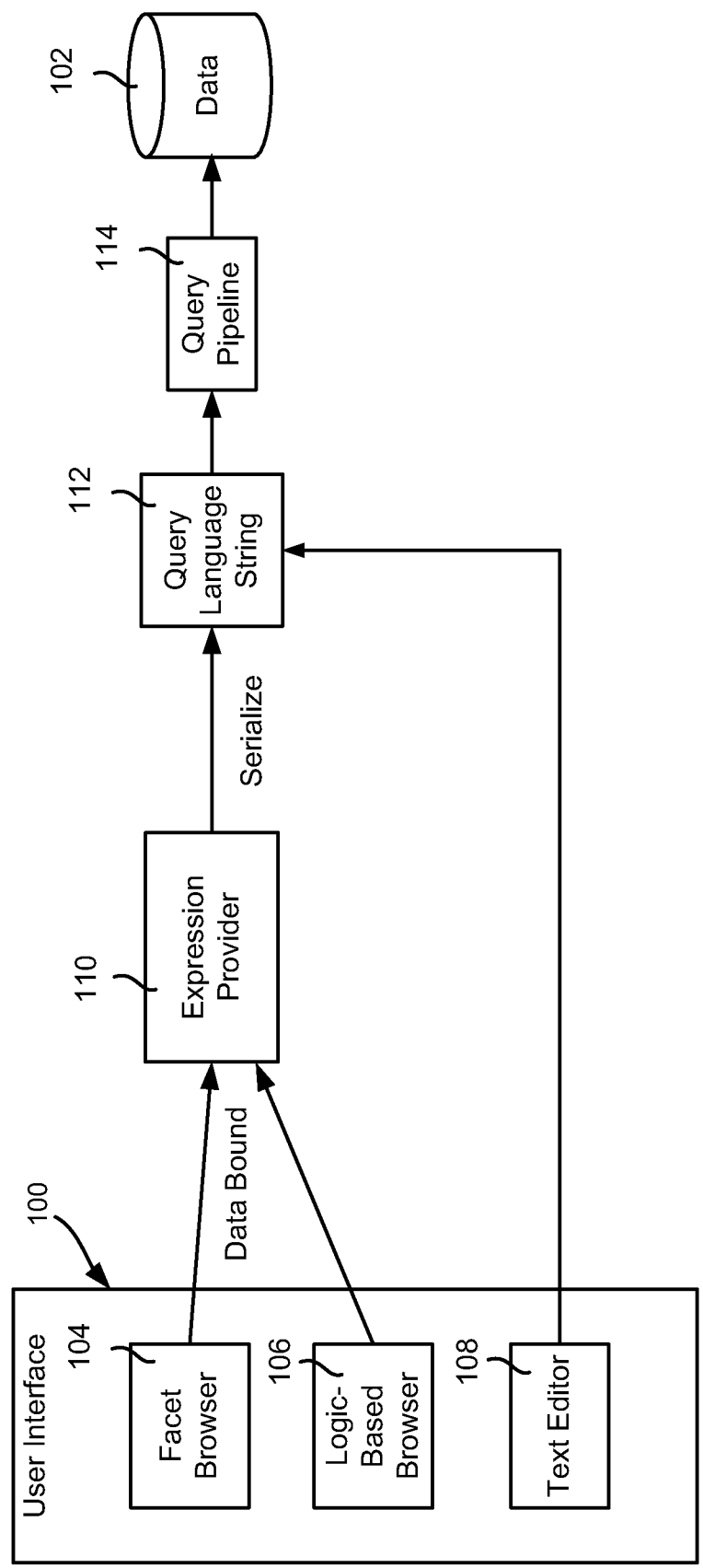
FIG. 1 is a block diagram showing an example components for composing queries, including facet, logic and textual-based components.

FIG. 1 is a block diagram showing a research environment (e.g., related to Microsoft® Amalga™) that allows researchers to have multiple query definition experiences at once via a unified user interface 100. The user may construct and submit queries against data 102 in various ways, including by data browsing (faceted browsing) via a facet browser 104, by query language independent (logic-based) querying via a logic-based browser 106 and by textual based queries (e.g., SPARQL queries) entered via a text editor 108.

The facet browser and logic browser provide information that is serialized into a query language string 112 via an expression provider 110. The text editor may directly output the query language 112. The query language is processed into a query that is then used by a query submission pipeline 114 to access the data 102 to obtain query results. One suitable query pipeline is a data transformation pipeline as described in U.S. provisional patent application Ser. No. 61/107,069.

Figure 2:
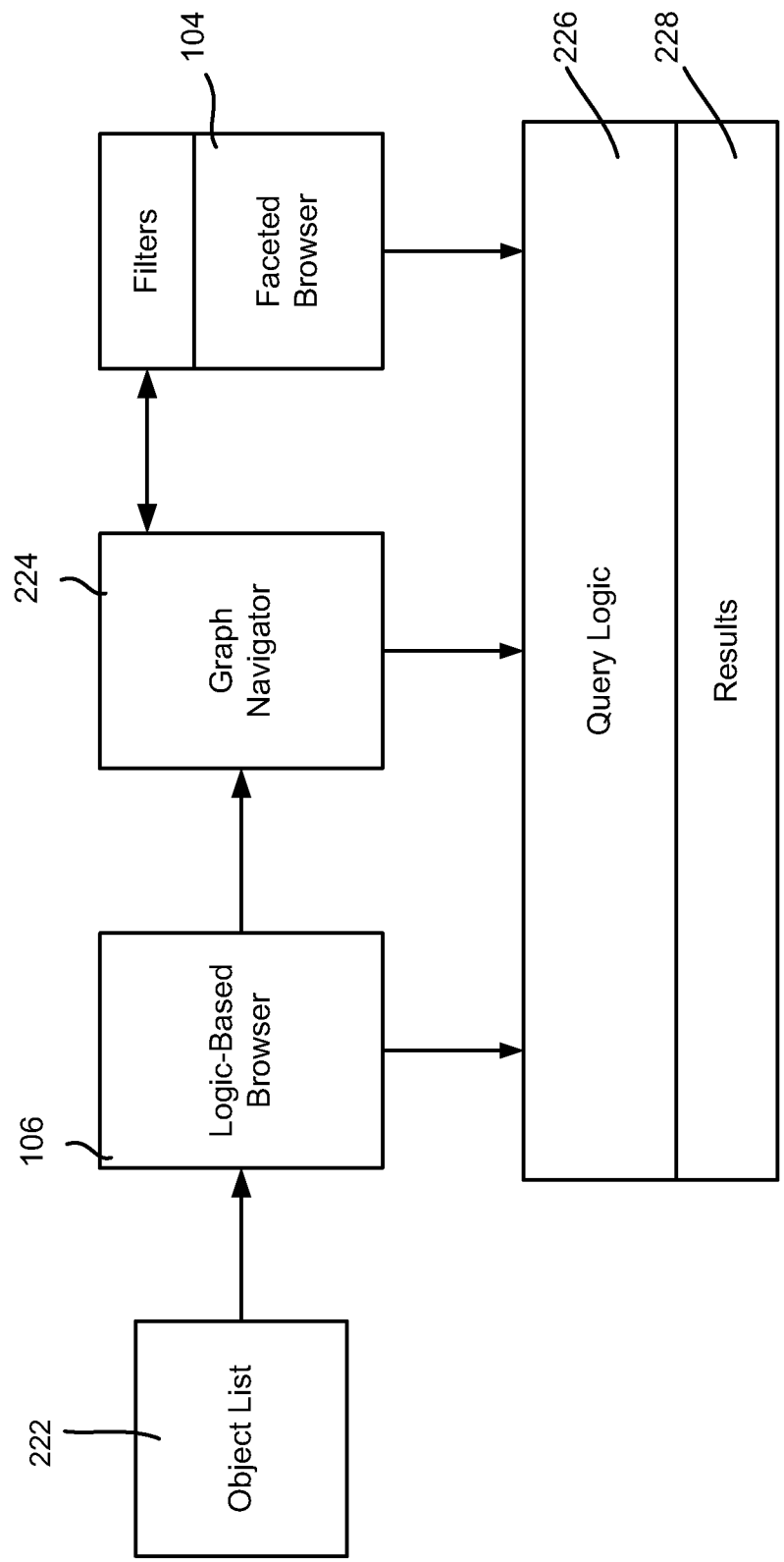
FIG. 2 is a block diagram showing how objects and facets may be used to compose queries.

FIG. 2 describes additional concepts regarding the facet browser 104, and logic-based browser 106, as well as a graph navigator 224. For the graph navigator 224, the user may query by interaction with a graph, such as an SST type of graph in which nodes represent concepts and links represent relationships between those concepts.

Figure 4:
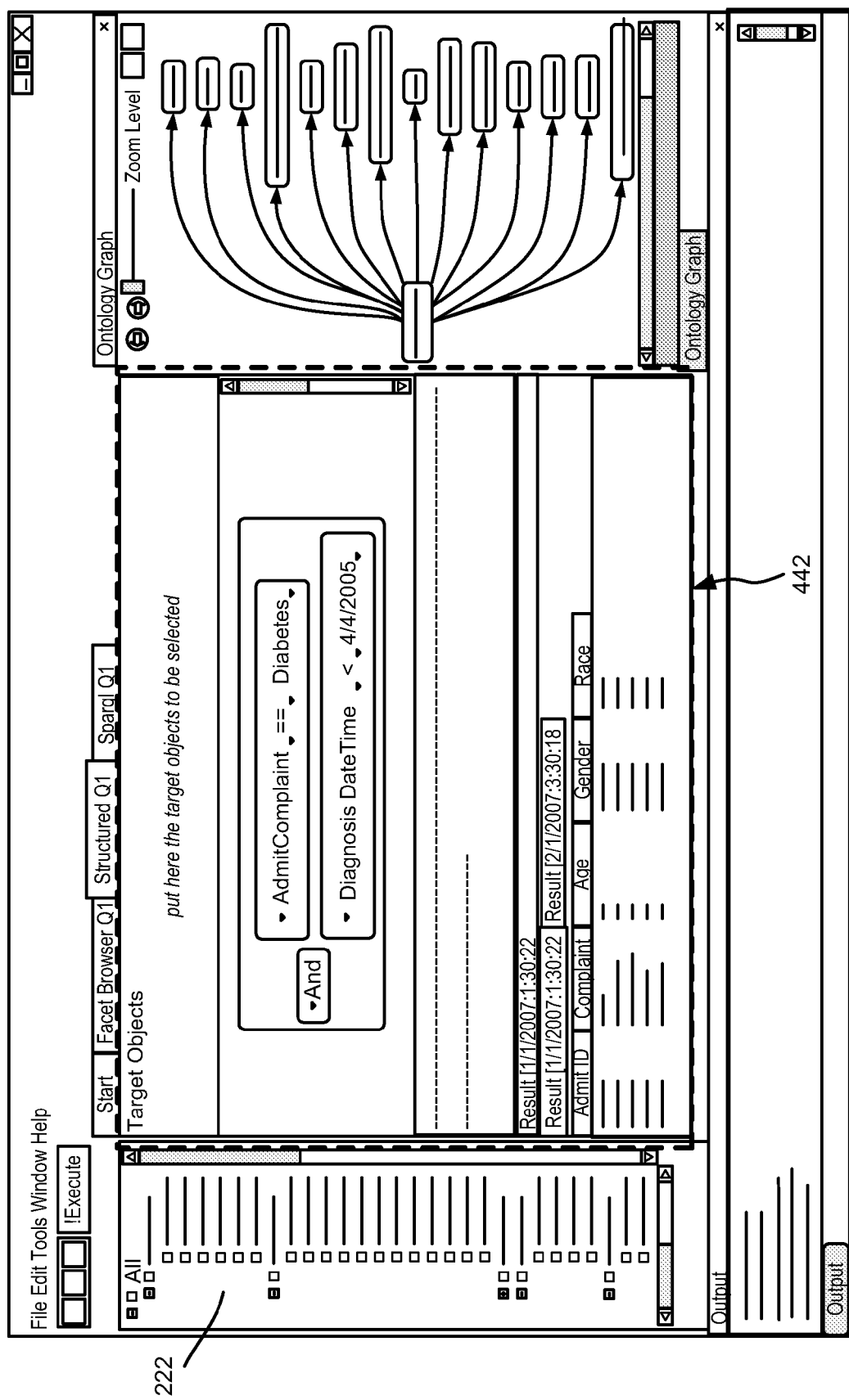
FIG. 4 is a representation of an example logic-based browser in which queries are built by logically combining object-related data.

A user selects objects from an object list 222 and puts them into an area of the logic based browser 106, (as also represented in FIG. 4). The user interacts to select how these objects are logically combined (e.g., AND-ed, OR-ed and so forth) by query logic 226 into the query that is then submitted to provide results 228.

As described with reference to FIG. 3, the facet browser provides facets (e.g., a collection of related properties for a given object or similar set of objects) corresponding to filters that allow the user to select desired filtering criteria. These are AND-ed together by the query logic 226 to provide results.

Figure 3:
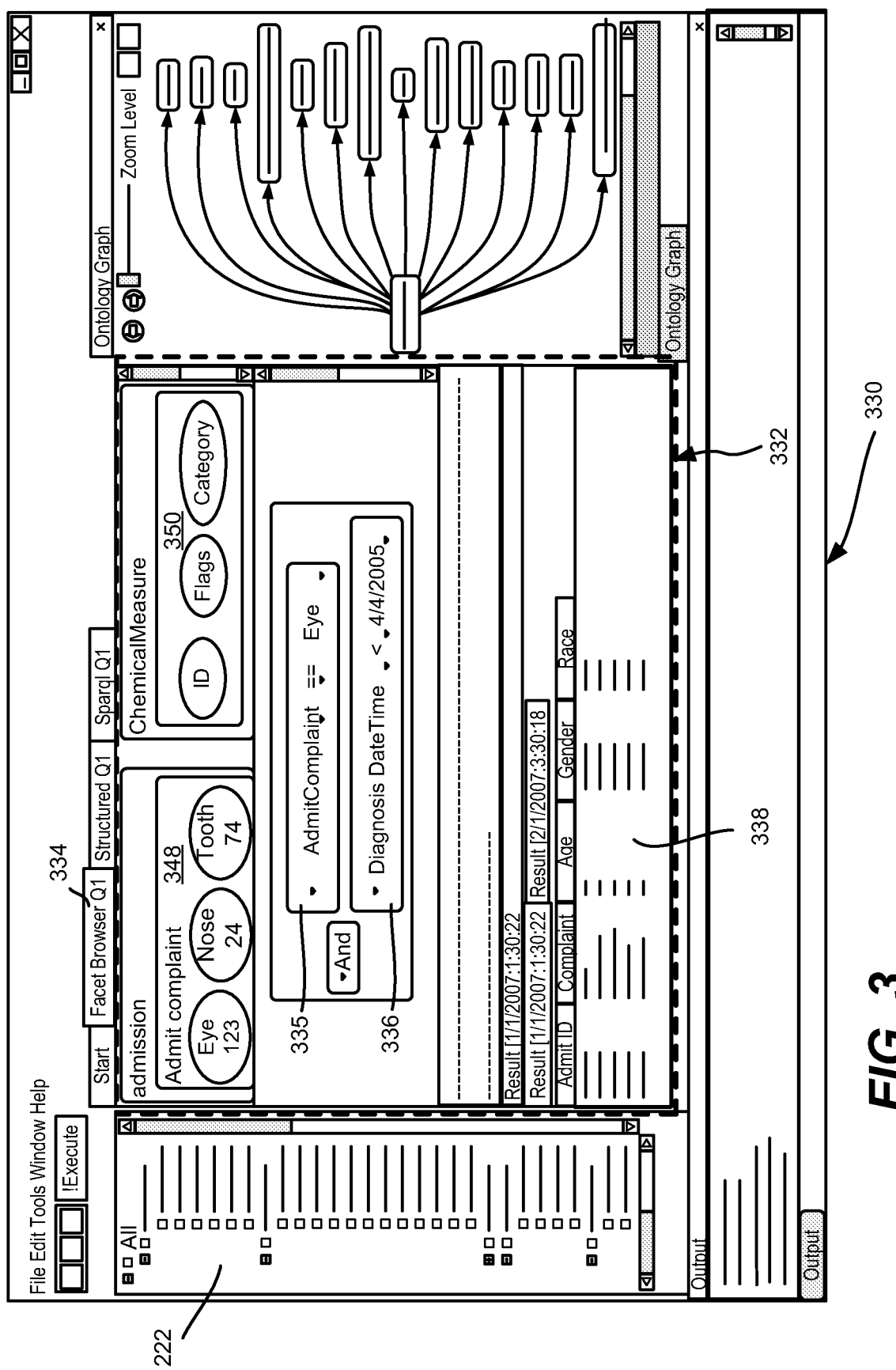
FIG. 3 is a representation of an example facet browser in which filtering queries may be built via interaction with facets.

Turning to aspects of providing multiple query definition experiences that collaborate with one another towards the same goal (i.e. facet/logic/textual based query composition), FIGS. 3 and 4 provide example details of a facet-based query user interface 330 (corresponding to the facet browser 104) and logic-based query user interface 440 (corresponding to the logic-based browser 106), respectively. The text editor may be any suitable mechanism to input text, and is not shown herein for purposes of brevity. These user interfaces and underlying mechanisms give researchers the flexibility to start a query composition from very different points of view depending on the scenario (e.g., discovery versus a known path). Moreover, the user can switch between the different ways of composing a query, as desired.

One implementation thus offers three different ways of composing query documents, namely using a text editor 108 to compose a query, using a facet browser 104 to set up filters while browsing the data (FIG. 3), and/or using a query builder (e.g., in the logic-based browser 106) to build logical expressions (FIG. 4) and have them converted into a query 112. The table below summarizes these three types of queries:

|  | Facet-based query (FQ) | Logic-based query (LQ) | Textual SPARQL query (SQ) |
| --- | --- | --- | --- |
| Targeted experience | Data browsing | Query language independent query | SPARQL queries |
| Allowed constraints | AND only | Any arbitrary Boolean logics | SPARQL |
| Can be converted to | LQ, SQ | SQ | None |

In one implementation, a facet based query is composed inside the facet browser (as indicated by the dashed box 332), e.g., via a gadget. The user browses an appropriate set of data (e.g., medical/clinical research data using a facet view control displayed on top of a software program (such as a gadget), e.g., corresponding to tab 334. When selected, facet clusters (blocks 348 and 350, with the bubbles representing the facets) correspond to and form one or more filters 335, 336 which combine using a logical AND. Aggregated results 338 are obtained and displayed each time the filters are changed. As indicated by the scrollbars, any number of facets may be selected for filtering.

When selecting facet clusters, the facet browser 332 may make more than one query. In one implementation, each cluster displays an aggregated result by sending a specific query for the cluster; the queries use the same set of filters.

Assuming that there is a set of filters F(f1, f2, . . . ), and given a set of properties of an object (p1, p2, p3, . . . , pn), the facet browser creates value clusters for each property ((p1$v$1, p1$v$2, . . . ), (p2$v$1, p2$v$2, . . . ), . . . , (pn$v$1, pn$v$2, . . . )). Suppose that Q(constraints) denotes a query with constraints. The following queries are created: (Q11(p1==p1$v$1 & F), Q12 (p1==p1$v$2 & F), . . . ), (Q21(p2==p2$v$1 & F), Q22(p2==p2$v$2 & F), . . . ), and so forth. Some optimization may be done to combine queries and use group-by to separate between property values. For example, a single query Q((p1==p1$v$1 or p1==p1$v$2 or p1==p1$v$3 . . . ) & F) group by p1 can be made to avoid sending too many queries to a data provider service.

If a facet cluster representing a property value is selected, a new filter is added to the filter list: F=F and f. The user can delete a filter from the filter list. The facet clusters are reset to take into account the filter changes.

Besides the aggregated results for each cluster, a result data set using the current filter set also may be retrieved each time the filter set is changed.

The persisted format of a facet-based query is as follows:

```
<SelectTarget>
    <Property name="[name of the property]"/>
    <Property name="[name of the property]"/>
    ...
</SelectTarget>
<Filters>
    <LogicalOperation Type="AND">
<LogicalStatement Property="[property name]" Comparator="[=|!=|>|<]"
    Value="[value]">
    ...
    </LogicalOperation>
</Filters>
```

Because the structure of the filters is the same between the facet-based query and the logic-based query, the translation to the targeted query language such as SPARQL is considered later when the logic-based query is considered.

A logic-based query is similar to SQL or SPARQL queries. It is composed of target objects and constraints. However, it has a query-language-neutral structure with respect to SQL or SPARQL. The target objects are a set of object properties selected from a suitable set of objects, (e.g., SQL views). The constraints are logical expressions composed of other logical expressions grouped by logical operations AND or OR, as shown in the logic-based browser 440 of FIG. 4 (dashed block 442).

In one implementation, the persisted format is as below:

```
<SelectTarget>
    <Property name="[name of the property]"/>
    <Property name="[name of the property]"/>
    ...
</SelectTarget>
<Filters>
    [LogicalExpression]
</Filters>
LogicalExpression := LogicalOperation | LogicalStatement.
LogicalOperation := <LogicalOperation Type="[AND | OR]">
LogicalExpression+
    </LogicalOperation>.
LogicalStatement := <LogicalStatement Property="[property name]"
    Comparator="[=|!=|>|<]" Value="[value]" />
```

In the persisted XML document, the SelectTarget element contains properties of the objects. The Filters element is a LogicalExpression which can be either a LogicalOperation or LogicalStatement. The LogicalOperation element can have attribute "type" set to "AND" or "OR"; (NOT may not be supported). The LogicalStatement element has three attributes: Property, Comparator and Value. For example, one main subject of a set of medical-related views is the patient visit, in which the information is centered on the patient visit. Therefore the property attribute of a LogicalStatement has the implicit prefix "PatientVisit". For example: PatientVisit.ChemicalMeasure.ObservationID is a property. The Comparator may have the following values: "=", "< >", ">", "<". If a property value has to be compared to NULL, it can done using "p< >null". The property values need to be of the property type. For example, an arbitrary string should not be allowed if the property only accepts a UMLS CUI (Unified Medical Language System/Concept Unique Identifiers).

The following types are identified:

Application Specific concepts: for example, UMLS format-related data for medical systems; e.g., a Mapping Service keeps track of the user inputted string and UMLS concepts conversions so that queries can contain the UMLS data and the Mapping Service can be invoked to convert the data to strings. The query engine translates data strings in the query results to UMLS data so that the UMLS concept values are in UMLS format when the client receives them.

String: Any ASCII string; Unicode UTF7 or UTF8 strings may be supported.

Bool: System.Boolean?
integer: System.Int32? (nullable)
Float: System.Float? (nullable)
DateTime: System.DateTime? (nullable)

In one implementation, the queries in their logic based query form are not directly recognized by a Query Service. They are thus automatically translated to SPARQL.

Unlike SQL, SPARQL uses pattern matching and filters. The translation can use the both patterns and filters:

EXAMPLE 1

```
(o1.p1 != v1) AND (o2.p2 > v2)
    Can be translated to:
Select ?x
Where
{
?o1 predicate:hasP1 ?p1.
        FILTER (?p1 != v1)
?o2 predicate:hasP2 ?p2.
        FILTER (?p2 > v2)
}
```

EXAMPLE 2

```
    (o1.p1 != v1) OR (o2.p2 > v2)
            Can be translated to
Select ?x
Where
{
        ?o1 predicate:hasP1 ?p1.
        ?o2 predicate:hasP2 ?p2.
            FILTER (?p1 != v1 || ?p2 > v2)
}
```

Thus, a basic form of a query is the SPARQL query. It is in a plain text format. Both facet-based queries and logic-based queries can be converted into SPARQL. (Note however that the conversion in the opposite direction may or may not be supported depending on a given implementation.)

The user does not have to compose the SPARQL query from scratch. The SPARQL text representation of a facet based query or a logic based query can be copied and pasted into a SPARQL query editor.

When persisted, the SPARQL query strings are in a CDDATA section of the query element.

```
<Query type="SPARQLText">
[CDDATA[ Select ?x
```

-continued

```
Where
{
    ?o1 predicate:hasP1 ?p1.
    ?o2 predicate:hasP2 ?p2.
    FILTER (?p1 != v1 || ?p2 != v2)
}
]]
</Query>
```

In one implementation, one data source is implicitly the triples view, such as one that combines the medical system data, the UMLS ontology and the UMLS CUI mapping, whereby the data source is implicit in the context of the operation and the technology may or may not identify the data source(s) using the "from" syntax.

The results are optional. In other words, a document may contain only the query document. The queries do not have identities. This means that a query may be saved into one or more files and loaded separated. When loaded, queries are not compared with each other. Even though two queries are identical, their results are not merged together.

The user can selectively save no results, all of the results or just some of the results. The results not selected to be saved are discarded.

Each result is saved with attributes, including the date and time of the query execution and the identifier of the database. In fact, the result can be different if the query is executed in a different time or with a different database.

The query and results document can be reloaded at a later time. The user can delete the existing results or get new results by executing the query again.

If a query file is configured as read-only or locked and query execution yields results, the user is prompted to save to a different file with the results because the query and result document is different and cannot be saved to the original file.

The result is saved as a XML DataSet. Queries can be made against this dataset.

Exemplary Operating Environment

Figure 5:
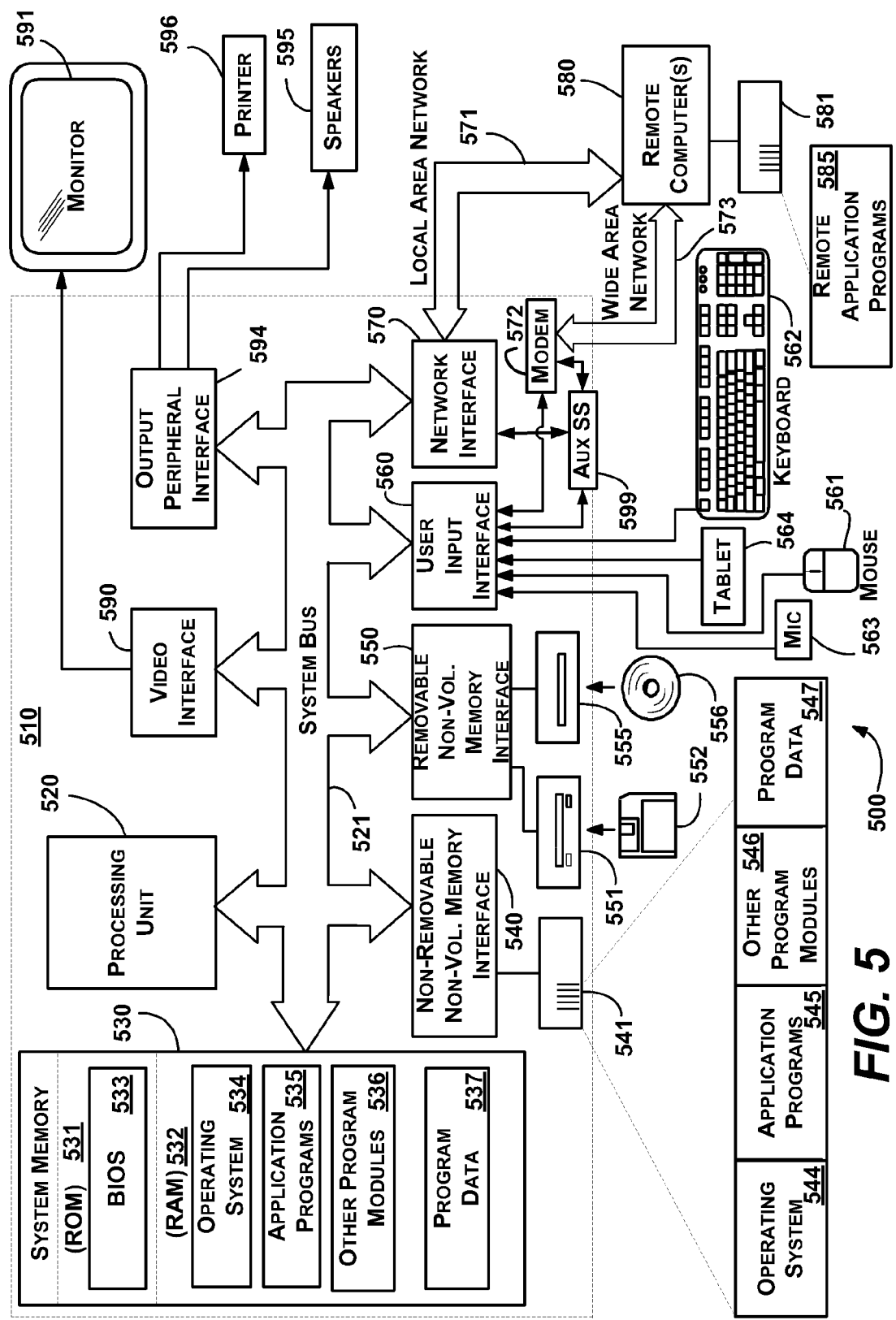
FIG. 5 is an illustrative example of a computing environment into which various aspects of the present invention may be incorporated.

FIG. 5 illustrates an example of a suitable computing and networking environment 500 into which the examples and implementations of any of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a system comprising:
one or more processors;
a unified user interface implemented on the one or more processors and configured to compose queries via a plurality of mechanisms, including a facet-based user interface by which users select filtering criteria corresponding to facets, and a logic-based user interface by which users logically combine object data, wherein the logic-based user interface is query-language independent, and wherein an object includes a set of properties, and wherein the facet-based user interface creates value clusters for each property of the object, the value clusters used by the facet-based user interface to optimize a query; and
query logic configured to process the filtering criteria into a query by logically AND-ing selected facets if the users select the filtering criteria corresponding to facets via the facet-based user interface, or configured to logically combine the object data into a query if the users logically combine the object data via the logic-based user interface, or configured to both process the filtering criteria into a query and logically combine the object data into a query if the users switch between both the logic-based user interface and the facet-based user interface of the unified user interface during query composition.

2. The system of claim 1 further comprising, a text editor configured to compose a text-based query.

3. The system of claim 1 wherein the unified user interface includes tabs for selecting between the facet-based user interface and logic-based user interface.

4. The system of claim 1 wherein the object data is composed of one or more target objects and one or more constraints.

5. The system of claim 1 wherein the query logic combines the object data into a query by logically combining sets of object data, each set combined via a user-selectable logical expression.

6. The system of claim 1 wherein the queries composed by the logic-based query user interface that is query-language independent are automatically translated to SPARQL.

7. The system of claim 1 wherein the query logic includes an expression provider that serializes data into a query language string.

8. The system of claim 1 further comprising a graph navigator, by which interaction with a graph selects information for processing into a query by the query logic.

9. The system of claim 1 wherein the query is submitted against medical data.

10. The system of claim 1 wherein the facet-based user interface displays a representation of each facet that may be selected for filtering, or displays a representation of each filter, or displays both a representation of each facet that may be selected for filtering and a representation of each filter.

11. The system of claim 1 wherein the logic-based user interface displays a representation of object data and how that object data is to be logically combined into a query.

12. The system of claim 1 wherein query is dynamically generated and submitted as the user interacts with the facet-based user interface or the logic-based user interface, and wherein the facet-based user interface and the logic-based user interface dynamically output query results that are returned in response to submitting the query.

13. In a computing environment, a system comprising:
one or more processors;
a unified user interface implemented on the one or more processors and further comprising:
a first query composition mechanism that is based on a discovery scenario, including filtering criteria for user selection; and
a second query composition mechanism that is based on a known path and is query-language independent, including object data for combination by a user; and
query logic, coupled to the first query composition mechanism and the second query composition mechanism, the query logic configured to compose a query based on at least one of user interaction with the filtering criteria of the first query composition mechanism, user interaction with the object data of the second query composition mechanism accessed via the unified user interface, or both the user interaction with the filtering criteria and the user interaction with the object data if the user switches between both first query composition mechanism and the second query composition mechanism of the unified user interface during query composition and wherein an object includes a set of properties, and wherein the first query composition mechanism creates value clusters for each property of the object, the value clusters used by the first query composition mechanism to optimize a query.

14. The system of claim 13 wherein the first query composition mechanism comprises a facet-based query mechanism, and wherein the second query composition mechanism comprises a logic-based query mechanism.

15. The system of claim 14 wherein the queries composed by the logic-based query mechanism are automatically translated to SPARQL.

16. The system of claim 13 wherein the unified user interface further comprises:
a text editor configured to compose a text-based query.

17. In a computing environment, a system comprising:
one or more processors;
a unified user interface, implemented on the one or more processors, and configured to compose queries, the unified user interface further comprising:
a facet-based user interface for selecting filtering criteria;
a logic-based user interface for logically combining selected object data, wherein the logic-based user interface is query-language independent;
a text editor for composing a query; and
query logic, coupled to the facet-based user interface and the logic-based user interface, and configured to perform at least one of processing the filtering criteria into a query, logically combining the object data into a query, or both processing the filtering criteria and logically combining the object data into a query if a user switches between both the logic-based user interface and the facet-based user interface of the unified user interface during query composition, the query submitted to a query pipeline to query against a data store and receive query results in response, wherein an object includes a set of properties, and wherein the facet-based user interface creates value clusters for each property of the object, the value clusters used by the facet-based user interface to optimize a query.

18. The system of claim 17 wherein the query logic processes the filtering criteria into a query by logically AND-ing selected facets.

19. The system of claim 17 wherein the query logic combines the selected object data into a query by logically combining sets of object data, each set combined via a user-selectable logical expression.

* * * * *